United States Patent
Edwards et al.

(10) Patent No.: US 10,894,640 B2
(45) Date of Patent: Jan. 19, 2021

(54) AUTOMATIC BEVERAGE MIXER

(71) Applicant: Fox Deluxe Fine Brands, LLC, Campbell, CA (US)

(72) Inventors: Mark E. Edwards, Los Gatos, CA (US); Nathaniel I. Stewart, Los Gatos, CA (US)

(73) Assignee: Fox Deluxe Fine Brands, LLC, Campbell, CA (US)

( * ) Notice: Subject to any disclaimer, the term of this patent is extended or adjusted under 35 U.S.C. 154(b) by 0 days.

(21) Appl. No.: 15/810,778

(22) Filed: Nov. 13, 2017

(65) Prior Publication Data

US 2018/0134470 A1 May 17, 2018

Related U.S. Application Data

(60) Provisional application No. 62/421,097, filed on Nov. 11, 2016.

(51) Int. Cl.
- *B65D 51/28* (2006.01)
- *A23L 2/52* (2006.01)

(52) U.S. Cl.
CPC ............ *B65D 51/2835* (2013.01); *A23L 2/52* (2013.01); *A23V 2002/00* (2013.01)

(58) Field of Classification Search
CPC ................ B65D 51/28; B65D 51/2807; B65D 51/2814; B65D 51/26; B65D 47/06; B65D 85/00; B65D 25/08; B65D 51/20; B65D 47/0857; B65D 39/00; B65D 51/2835; B65D 51/00; B65D 43/0225; A23L 2/52; B65B 7/28
See application file for complete search history.

(56) References Cited

U.S. PATENT DOCUMENTS

| | | | |
|---|---|---|---|
| 1,748,483 A | 2/1930 | Hyde | |
| 2,013,616 A | 9/1935 | Rettenmeyer | |
| 2,258,524 A | 10/1941 | Vigurs | |
| 3,572,336 A | 3/1971 | Hershberg | |
| 4,070,249 A | 1/1978 | Janin et al. | |
| 4,232,797 A * | 11/1980 | Waterbury | B65D 39/00 220/834 |
| 4,416,279 A * | 11/1983 | Lindner | A61B 5/15186 606/182 |
| 4,645,352 A | 2/1987 | Valbona et al. | |
| 4,872,764 A | 10/1989 | McClean | |
| 6,561,232 B1 | 5/2003 | Frutin | |
| 6,763,939 B2 | 7/2004 | Alticosalian | |
| 6,843,368 B1 | 1/2005 | Frutin | |
| 6,908,011 B2 | 6/2005 | Cho | |
| 6,913,165 B2 | 7/2005 | Linz et al. | |

(Continued)

FOREIGN PATENT DOCUMENTS

| | | |
|---|---|---|
| EP | 1270435 A2 | 1/2003 |
| JP | 2006001581 A | 1/2006 |

(Continued)

*Primary Examiner* — Ericson M Lachica
(74) *Attorney, Agent, or Firm* — Kilpatrick Townsend & Stockton LLP

(57) ABSTRACT

A cap that can be attached onto a container such as a standard-sized aluminum drink can. The cap has a chamber that contains fluid that can be mixed with the fluid in the aluminum drink can to form a mixed beverage. A consumer may drink the beverage through the cap.

14 Claims, 4 Drawing Sheets

(56) References Cited

U.S. PATENT DOCUMENTS

| | | |
|---|---|---|
| 6,926,138 B1 * | 8/2005 | Basham ............. B65D 51/2828 206/219 |
| 6,948,642 B2 | 9/2005 | Awad |
| 6,974,024 B2 | 12/2005 | Cho |
| 6,994,211 B2 | 2/2006 | Cho |
| 7,025,224 B2 * | 4/2006 | Coleman .............. B65D 51/007 220/802 |
| 7,325,676 B2 | 2/2008 | Galaz Rodriguez |
| 7,886,899 B2 | 2/2011 | Frutin |
| 9,242,772 B1 | 1/2016 | Anderson et al. |
| 2004/0200740 A1 | 10/2004 | Cho |
| 2005/0029685 A1 | 2/2005 | Zhao |
| 2006/0169355 A1 * | 8/2006 | Wong ................ B65D 21/0238 141/319 |
| 2007/0199838 A1 * | 8/2007 | Oh ......................... B65D 51/28 206/219 |
| 2009/0139951 A1 | 6/2009 | Chen |
| 2009/0236244 A1 | 9/2009 | Frutin |
| 2009/0260999 A1 * | 10/2009 | Yang .................... B65D 47/141 206/219 |
| 2009/0308831 A1 * | 12/2009 | Anderson .......... B65D 51/2807 215/227 |
| 2010/0024660 A1 | 2/2010 | Wallace |
| 2010/0089860 A1 * | 4/2010 | Wiggins ............... B65D 51/225 215/47 |
| 2015/0057604 A1 * | 2/2015 | Arami ............... A61M 37/0015 604/46 |
| 2017/0050762 A1 * | 2/2017 | Hamilton ............... B65D 23/12 |
| 2017/0265847 A1 * | 9/2017 | Cortelazzo ......... A61B 10/0096 |

FOREIGN PATENT DOCUMENTS

| | | |
|---|---|---|
| WO | 0183313 A2 | 11/2001 |
| WO | 2007129116 A1 | 11/2007 |
| WO | 2010084176 A1 | 7/2010 |

* cited by examiner

AUTOMATIC BEVERAGE MIXER

CROSS-REFERENCES TO RELATED APPLICATIONS

This application claims the benefit of U.S. Provisional Application No. 62/421,097, filed Nov. 11, 2016, entitled "AUTOMATIC BEVERAGE MIXER," which is incorporated herein by reference in its entirety for all purposes.

BACKGROUND OF THE INVENTION

This invention relates to beverage dispensers and more particularly to a device for mixing beverages.

There are various ways to make mixed drinks. Commonly, hand-mixed drinks require multiple containers and a knowledgeable service worker to perform the mixing. What is needed is a simpler mechanism to mix drinks, particularly drinks made from ingredients in pre-packaged containers, such as Bloody Mary mix, tonic water, sodas, and juices in serving-sized bottles or cans.

Information related to attempts to address these problems can be found in U.S. Pat. Nos. 1,748,483; 2,013,616; 2,258,524; 4,645,352; 4,872,764; and 6,913,165 as well as United States Patent Application Publication Numbers: 2001/00024660 and 2005/0029685, for example. Various types of hand-held beverage mixers, including some embodiments of the invention, can mitigate or reduce the effect of, or even take advantage of, some or all of these potential problems.

BRIEF SUMMARY OF THE INVENTION

According to the invention a cap is provided that is configured to be attached onto a container such as a standard-sized aluminum drink can. The cap has a chamber that contains fluid that can be mixed with the fluid in the aluminum drink can to form a mixed beverage. A consumer may drink the beverage through the cap.

A device comprises a housing with a lid, a rim, a membrane, a piston element and a chamber. The chamber is bounded and sealable by the lid and the membrane on opposing ends of the housing. The chamber configured to enclose a first fluid and the rim is configured to engage the top of an open container enclosing a second fluid. The piston element is operable to breach the membrane in order to allow the first fluid to mix with the second fluid to form a mixture.

The piston element further includes a ring with threads The ring moveably engages the piston element. The ring is manually accessible to operate the piston element. The open container may be a drink can or drink bottle.

A method for preparing a mixed beverage comprises opening a container containing a first component. A cap device having a chamber containing a second component is oriented to the container by guiding a centering post located at the end of a cylinder. The cap device is snapped onto a rim of the container and a lock ring is moved. A membrane is breached to release the second component and the container and cap device are agitated to mix the first and second components together. At least one of the first and second components is a liquid and the liquid may be alcohol. The container may be a drink can or a drink bottle. The first and second components may be pre-measured and/or pre-packaged. The lid of the cap device is replaceable. The membrane may be breached by releasing a spring to activate a piston element. The method further comprises removing a lid of the cap device and optionally consuming at least some of the mixed beverage through the cap. The method may further comprise optionally re-sealing the cap device using the lid to store the mixed beverage.

These and other features, aspects, and advantages of various embodiments of the invention will become better understood with regard to the following description, appended claims, accompanying drawings and abstract.

DETAILED DESCRIPTION OF THE INVENTION

Figure 1:
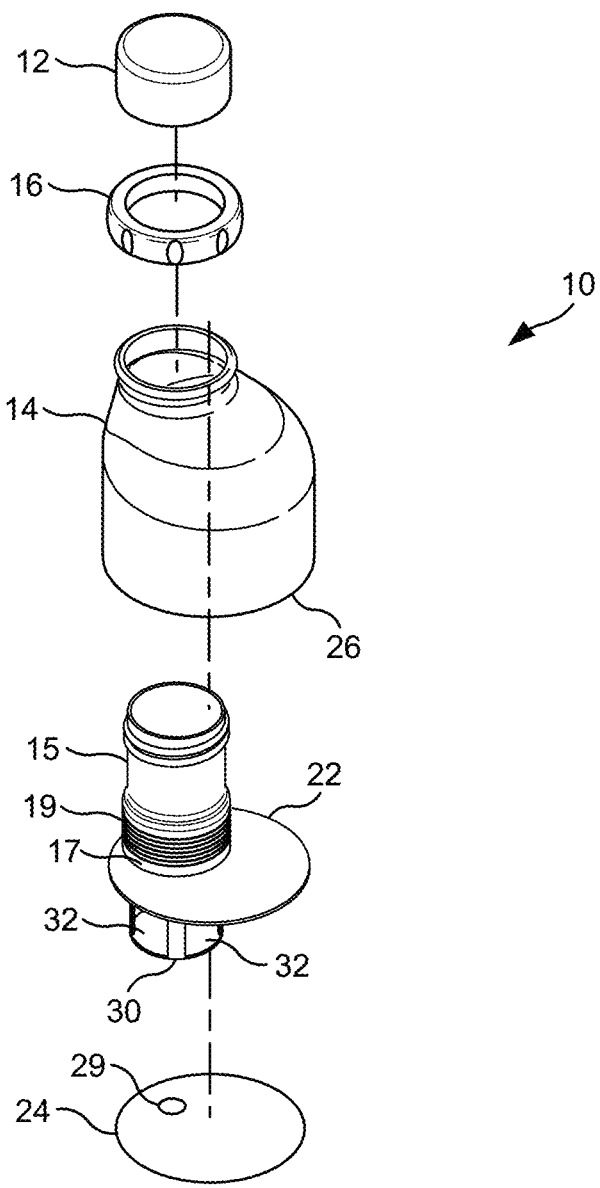
FIG. 1 is an exploded perspective view of a device according to the invention.
Figure 2:
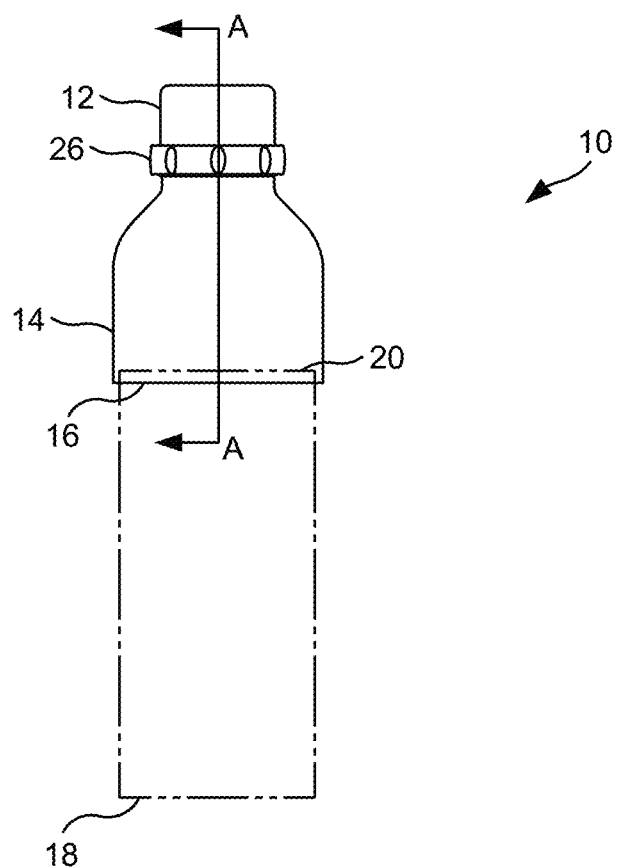
FIG. 2 is a front side view of a device according to the invention to be mounted on a cylindrical container and having section lines A-A marked.
Figure 3:
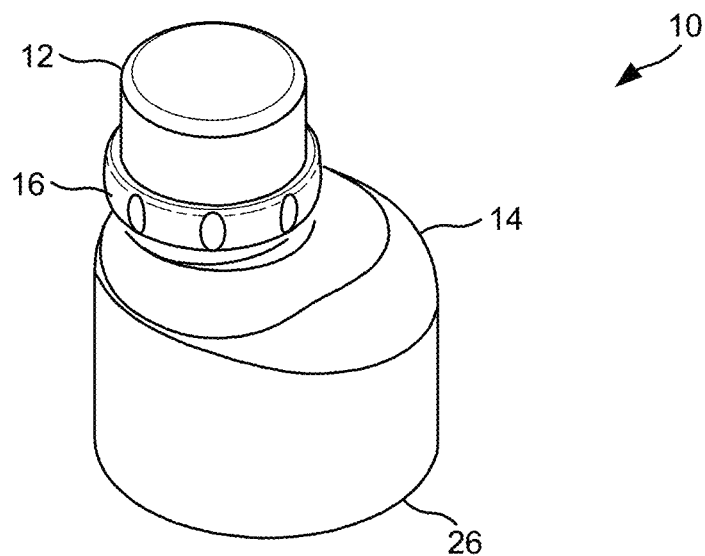
FIG. 3 is a perspective view of a first embodiment of a device according to the invention marked.

FIG. 1 is an exploded perspective view of a snap cap device 10. Referring collectively to FIGS. 1-4, it comprises a removable lid 12, a housing 14, a lock ring 16 for the lid 12 and a rim 26. Within the housing is a cylinder 15 around which is mounted to a slidable sleeve piston 17 with a coil spring 19. The snap cap device 10 is for mounting on a compatible container, such as an aluminum drink can 18 with a bezel top 20. In alternative embodiments, a bottle or jar with a finish may be mounted to a snap cap device.

Figure 4:
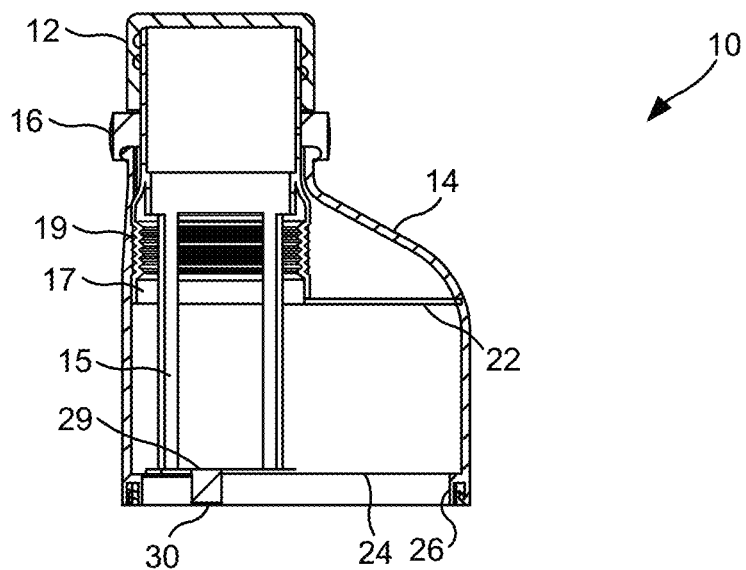
FIG. 4 is a side cross-sectional view along section A-A illustrating internal features of the embodiment of FIG. 2 marked.
Figure 5:
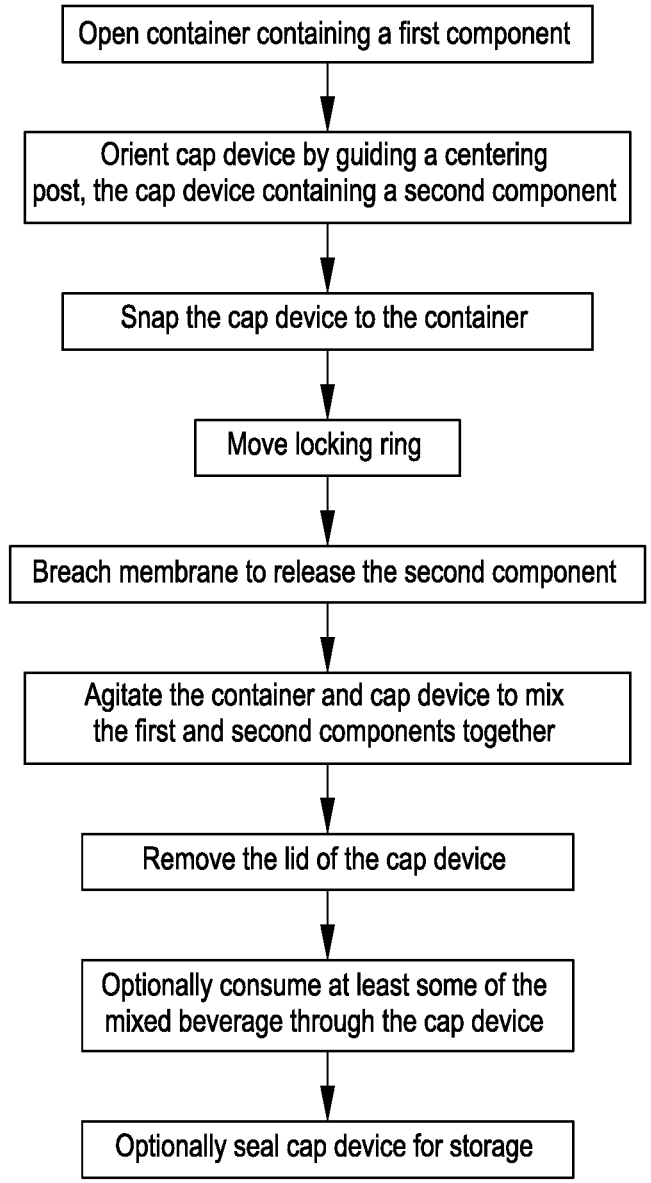
FIG. 5 is a method for preparing a mixed beverage according to an embodiment of the invention.

Referring to FIG. 4, the housing 14 contains a chamber 25 for a fluid, the chamber 25 being initially sealed both top by a moveable barrier 22 mounted to the sleeve piston 17 and at the bottom by a breachable membrane 24. Alternatively, the membrane 24 may be a removable disc with a closed but resealable orifice 29 disposed in line with the cylinder 19. The rim 26 is shaped and sized to fit over and seal to the receiving container. The bottom portion of the cylinder 15 has a centering post 30 and openings 32 to admit fluid into the chamber 26 for mixing with fluid from the receiving container.

Referring to FIGS. 1, 2, 4 and 5, the consumer opens the container 18. The rim 16 of the snap cap device 10 snaps onto the top of the container 18. The centering post 30 at the end of the cylinder 15 serves as a guide for the correct orientation of the cap device 10 to the container 18. The lock ring 16 on the lid 12 is turned until it is in a locked position, releasing the spring 19, causing the membrane 24 to breach, i.e., tear or puncture, by the piston action of piston 17. Alternatively, the piston action causes the orifice 29 to open.

The chamber 26 contains a fluid to be mixed with the content of the container 18. The consumer can then mix the drink by agitating the container 18 with the cap device 10, if the membrane 24 is breached or the orifice 29 is open. The lid 12 can be removed and the consumer can then drink the mixed drink through the open snap cap device 10. The fluid, for example alcohol, is initially contained inside the chamber 26 until it is mixed. The snap cap 10 can be sealed for storage of the mixed drink if it is not fully consumed.

The snap cap 10 has a sealing/adhesive mechanism, an O-ring 4, as well as a mechanical catch to lock onto the formed rim top 20 of the container 18. This creates a strong bond that is also liquid tight. The spring 19 allows the linear movement of piston 17 and barrier 22 while maintaining a liquid tight chamber 26. The ring 16 is threaded to allow the lowering or raising of the piston element 17. When translated sufficiently, tension on membrane 24 causes it to tear from its bonding or to puncture, thus allowing the liquid in the chamber 26 to freely flow through the open top of the container. Both cap and container may be made from recyclable materials.

Although embodiments of the invention have been described in considerable detail with reference to certain preferred versions thereof, other embodiments are possible. Therefore, the spirit and scope of the appended claims should not be limited to the descriptions of the embodiments above.

What is claimed is:

1. A method for preparing a mixed beverage, the method comprising:
    obtaining a container comprising a sidewall, a first component, and an off-center opening disposed on a surface of the container, wherein the off-center opening is initially sealed, and wherein the off-center opening in the container is off-center with respect to the sidewall of the container;
    opening the container to expose the off-center opening;
    orienting a cap device having a chamber containing a second component to the container by rotating the cap device such that the exposed off-center opening of the container is aligned with a centering post extending from a bottom surface of the cap device, wherein the centering post is off-center with respect to a perimeter of the bottom surface of the cap device such that the centering post is placed directly over the off-center opening of the container when the cap device is oriented, and wherein the bottom surface of the cap device is configured to face the surface of the container comprising the off-center opening;
    snapping the cap device onto a rim of the container;
    moving a lock ring of the cap device after snapping the cap device onto the rim of the container;
    breaching a membrane of the cap device to release the second component into the container; and
    agitating the container and cap device to mix the first and second components together.

2. The method of claim 1, wherein the membrane is breached by releasing a spring to activate a piston element.

3. The method of claim 1, further comprising:
    removing a lid of the cap device; and
    optionally consuming at least some of the mixed beverage through the cap device.

4. The method of claim 3, further comprising:
    optionally re-sealing the cap device using the lid to store the mixed beverage.

5. The method of claim 1, wherein at least one of the first and second components is a liquid.

6. The method of claim 5 wherein the liquid is alcohol.

7. The method of claim 1, wherein the container is a drink can or drink bottle.

8. The method of claim 1, wherein the first and second components are pre-measured.

9. The method of claim 1, wherein the first and second components are pre-packaged.

10. The method of claim 3, wherein the lid of the cap device is replaceable.

11. The method of claim 1, wherein moving the lock ring activates a piston element to cause the membrane to be breached.

12. The method of claim 11, wherein moving the lock ring releases a spring element, and wherein the release of the spring element activates the piston element.

13. The method of claim 11, wherein moving the lock ring comprises rotating the lock ring from a first position to a second position.

14. The method of claim 11, wherein breaching the membrane comprises breaching the membrane with the piston element.

* * * * *